United States Patent
Priego et al.

(10) Patent No.: US 11,784,568 B2
(45) Date of Patent: Oct. 10, 2023

(54) LOW QUIESCENT CURRENT BUCK CONVERTER WITH DIRECT FEEDBACK

(71) Applicant: TEXAS INSTRUMENTS INCORPORATED, Dallas, TX (US)

(72) Inventors: Antonio Priego, Freising (DE); Gerhard Thiele, Dachau (DE); Manuel Wiersch, Freising (DE); Johann Erich Bayer, Thonhausen (DE)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 196 days.

(21) Appl. No.: 16/585,168

(22) Filed: Sep. 27, 2019

(65) Prior Publication Data
US 2020/0106360 A1   Apr. 2, 2020

Related U.S. Application Data

(60) Provisional application No. 62/740,262, filed on Oct. 2, 2018.

(51) Int. Cl.
*H02M 3/158* (2006.01)
*H02M 1/00* (2006.01)

(52) U.S. Cl.
CPC ....... *H02M 3/1582* (2013.01); *H02M 1/0061* (2013.01); *H02M 1/0003* (2021.05)

(58) Field of Classification Search
CPC ...... H02M 3/158; H02M 1/00; H02M 3/1582; H02M 2001/0003; H02M 1/0061; H02M 3/00; H02M 3/02; H02M 3/04; H02M 3/10; H02M 3/135; H02M 3/137; H02M 3/142; H02M 3/145; H02M 3/155; H02M 3/1552; H02M 3/156; H02M 3/1566; H02M 3/157; H02M 3/1588; H02M 1/0003; H02M 1/0009; H02M 1/0016; H02M 1/0019; H02M 1/0022; H02M 1/0025; H02M 1/0032; H02M 1/0045; H02M 1/14; H02M 1/143; H02M 1/15
USPC ............... 323/222–226, 259, 266, 271–275, 323/280–285, 351
See application file for complete search history.

(56) References Cited

U.S. PATENT DOCUMENTS

| | | | | |
|---|---|---|---|---|
| 6,366,066 | B1* | 4/2002 | Wilcox | G05F 1/565 323/351 |
| 8,154,268 | B2* | 4/2012 | Philbrick | H02M 3/158 323/285 |
| 2008/0088292 | A1* | 4/2008 | Stoichita | H02M 3/156 323/285 |
| 2009/0039841 | A1* | 2/2009 | Fabbro | H02M 3/1582 323/271 |
| 2014/0132232 | A1* | 5/2014 | MacLean | G05F 1/62 323/271 |
| 2015/0160669 | A1* | 6/2015 | Marschalkowski | G05F 1/59 323/273 |

(Continued)

*Primary Examiner* — Thienvu V Tran
*Assistant Examiner* — Carlos O Rivera-Perez
(74) *Attorney, Agent, or Firm* — Ray A. King; Frank D. Cimino

(57) ABSTRACT

A switching converter circuit includes a voltage regulation loop configured to provide an output voltage (VOUT) based on an input voltage (VIN). The switching converter circuit also includes a 100% mode circuitry coupled to the voltage regulation loop, wherein the 100% mode circuitry is configured to apply an offset to VOUT in response to detecting that VIN is approaching VOUT.

16 Claims, 9 Drawing Sheets

(56) References Cited

U.S. PATENT DOCUMENTS

2015/0180335 A1* 6/2015 Takada .................. H02M 3/156
                                                    323/288
2018/0337599 A1* 11/2018 Chen ..................... H02M 3/158

* cited by examiner

FSW VS. DUTY CYCLE

LOW QUIESCENT CURRENT BUCK CONVERTER WITH DIRECT FEEDBACK

CROSS-REFERENCE TO RELATED APPLICATIONS

This application claims priority to U.S. Provisional Application No. 62/740,262, filed Oct. 2, 2018, which is hereby incorporated by reference.

BACKGROUND

A straightforward step to reduce consumption in nano-Iq switching regulators is to remove any feedback divider (see FIG. 1). But a challenge in system voltage headroom arises if direct feedback is used: With no feedback divider, system reference VREF is equal to the targeted output voltage. In a 100% duty cycle mode (referred to hereafter as 100% mode), where VIN is equal or below VOUT target, the amplifier in charge of generating VREF (VREF_AMP in FIG. 1), supplied with VIN, enters in dropout. VREF falls several millivolts VDROP below VIN (VREF=VIN−VDROP). With VREF tracking VIN, the system keeps switching and regulating the output voltage VOUT towards the new reference VIN−VDROP and never enters 100% mode.

FIG. 2 shows waveforms representing a converter (e.g., the nano-Iq buck converter of FIG. 1) with an ideal transition to 100% mode. The converter regulates VOUT to a certain voltage level and VIN is swept in several steps from VIN=2×VOUT (duty cycle of 50%) down to VIN=VOUT (duty cycle of 100%). The hysteretic comparator in FIG. 1 ensures that the feedback voltage (VFB) stays within the hysteresis window VREF+/−VHYST/2. In the low-side phase (low-side FET on, IL and VFB ramping down), the hysteretic comparator compares VFB against the low-level threshold VREF−VHYST/2. When VFB falls below VREF−VHYST/2, the comparator output FB_COMP goes high terminating the low-side phase and initiating a high-side phase (high-side FET on, IL and VFB ramping up with slopes $m_{L1}$ and $m_1$ respectively). The comparator monitors VFB against the high-level threshold VREF+VHYST/2. Once VFB reaches the high-level threshold VREF+VHYST/2, the comparator output FB_COMP goes low terminating the high-side phase and initiating a new cycle.

The slope of the emulated ramp during high-side phase $m_1$ has the same VIN−VOUT dependency as the inductor current slope $m_{L1}$:

$$m_1 = \frac{V_{IN} - V_{OUT}}{R_{AUX} \times C_{AUX}} \quad m_{L1} = \frac{V_{IN} - V_{OUT}}{L_{OUT}} \qquad \text{Eq. (1)}$$

With VIN moving down as in FIG. 2 both slopes $m_1$ and $m_{L1}$ gets reduced until they both are zero at VIN=VOUT. Slopes $m_1$ and $m_{L1}$ equal to zero means that neither emulated ramp nor output voltage VOUT can rise during the high-side phase. Consequently VFB cannot reach the high-level threshold VREF+VHYST/2 and hysteretic comparator keeps HS FET steady on, i.e. the converter is in 100% mode.

In reality, under this operating condition (VIN equal to VOUT target), the VREF amplifier of a buck converter with direct feedback enters in dropout and VREF falls some millivolts VDROP below VIN. The converter does not regulate anymore to VOUT but to VIN−VDROP. This small constant drop VDROP in the output voltage respect to VIN is sufficient to ensure a non-zero ramp slope $m_{1\_min}$ when VIN VOUT:

$$m_{1\_min} = \frac{V_{DROP}}{R_{AUX} \times C_{AUX}}. \qquad \text{Eq. (2)}$$

With a non-zero ramp slope $m_{1\_min}$, VFB can rise during high-side phase and reach the high-level threshold VREF+VHYST/2. The hysteretic comparator can then terminate the high-side phase and initiate a new cycle. Consequently the converter keeps switching continuously and regulating the output voltage VOUT to the new voltage reference VIN−VDROP. The system never enters 100% mode (see e.g., FIG. 3).

SUMMARY

A new buck converter topology with direct feedback and 100% mode circuitry is presented. In one implementation, the new buck converter topology achieves a quiescent current (Iq) of 150 nA or less in the 100% mode.

BRIEF DESCRIPTION OF THE DRAWINGS

For a detailed description of various examples, reference will now be made to the accompanying drawings in which.

DETAILED DESCRIPTION

Disclosed herein is a new nano-Iq buck converter topology with direct feedback and 100% mode circuitry. As used herein, "direct feedback" refers to feedback from an output node of a converter without a feedback divider. Representations of the new nano-Iq buck converter topology and related waveforms or graphs are provided in FIGS. 5-9. Also, FIG. 4 includes a description of 100% mode entry issues and/or other related information. In the new nano-Iq buck converter topology, the 100% mode circuitry includes a 100% mode control circuit configured to determine when to apply an offset to the converter output voltage (VOUT), which expedites 100% mode entry and avoids reference voltage (VREF) amplifier dropout. In one option, the 100% mode control circuit determines when to apply the offset to VOUT by detecting when the converter input voltage (VIN) approaches VOUT to within a target threshold. One way to detect when VIN approaches VOUT is by using a time-based detection circuit (e.g., use a time reference and a time comparator to monitor when a high-side switch on-time (TON) is greater than a certain time threshold). Another option for detecting when VIN approaches VOUT involves a VIN−VOUT voltage comparator (to identify when VIN−VOUT is greater than or less than a voltage threshold).

In the new nano-Iq buck converter topology, the 100% mode circuitry also includes a 100% mode offset circuit configured to generate the offset in response to the 100% mode control circuit asserting a control signal (the control signal indicates that the offset is to be applied). In one example, the 100% mode offset circuit generates the offset by adjusting the voltage at the feedback (FB) node of the hysteretic comparator of the converter's voltage regulation loop. Another option for offset generation by the 100% mode offset circuit involves introducing an asymmetry in the input stage of the hysteric comparator by: 1) introducing an offset current into one of the branches in the input stage; 2) disconnecting/adding fingers to one of the input transistors; and 3) if degeneration resistors are used, introducing the offset there by changing size or injecting offset current.

Figure 1:
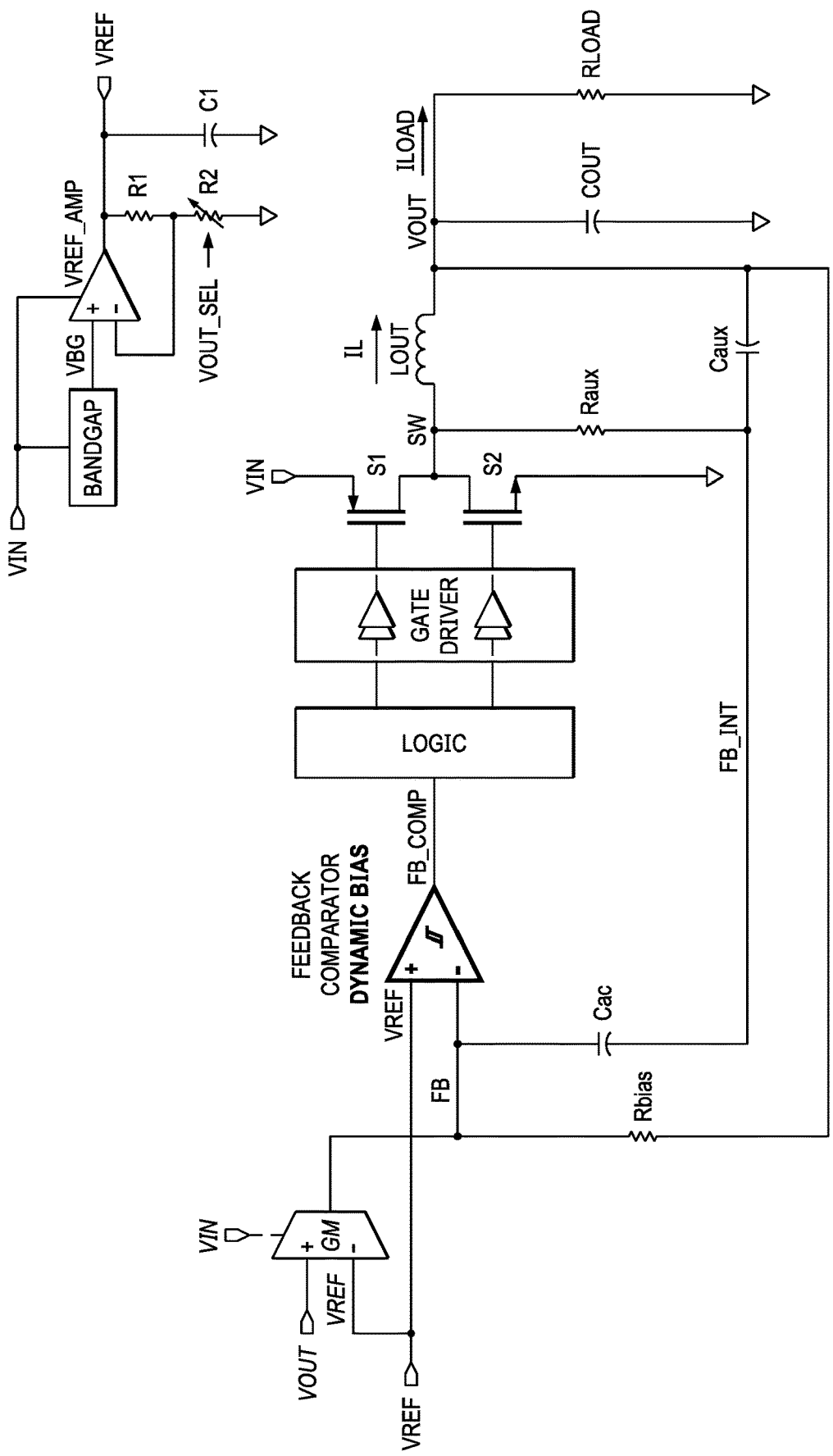
FIG. 1 is a block diagram of a nano-Iq buck converter topology with direct feedback.
Figure 2:
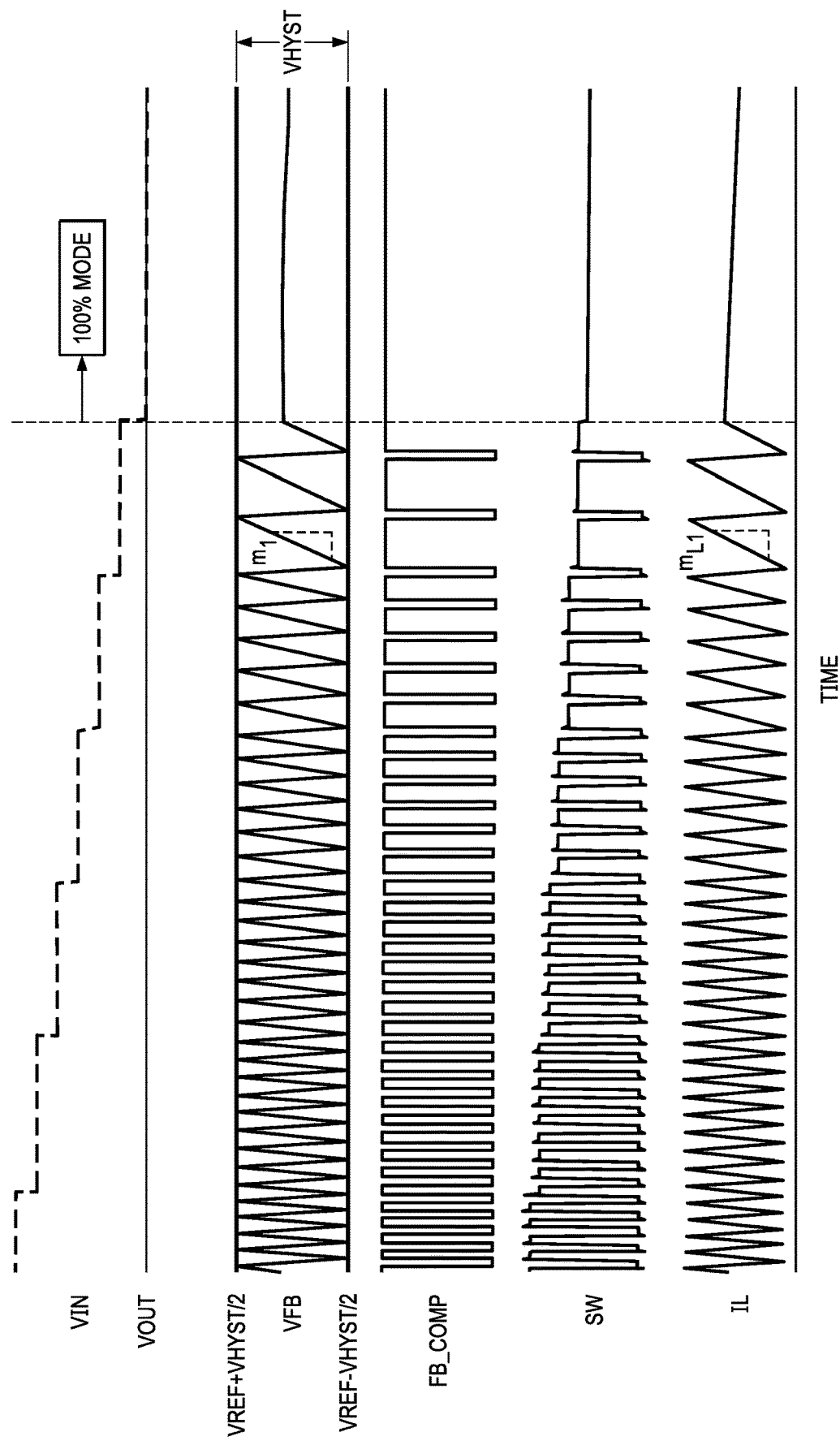
FIG. 2 is a timing diagram showing an ideal 100% mode entry.
Figure 3:
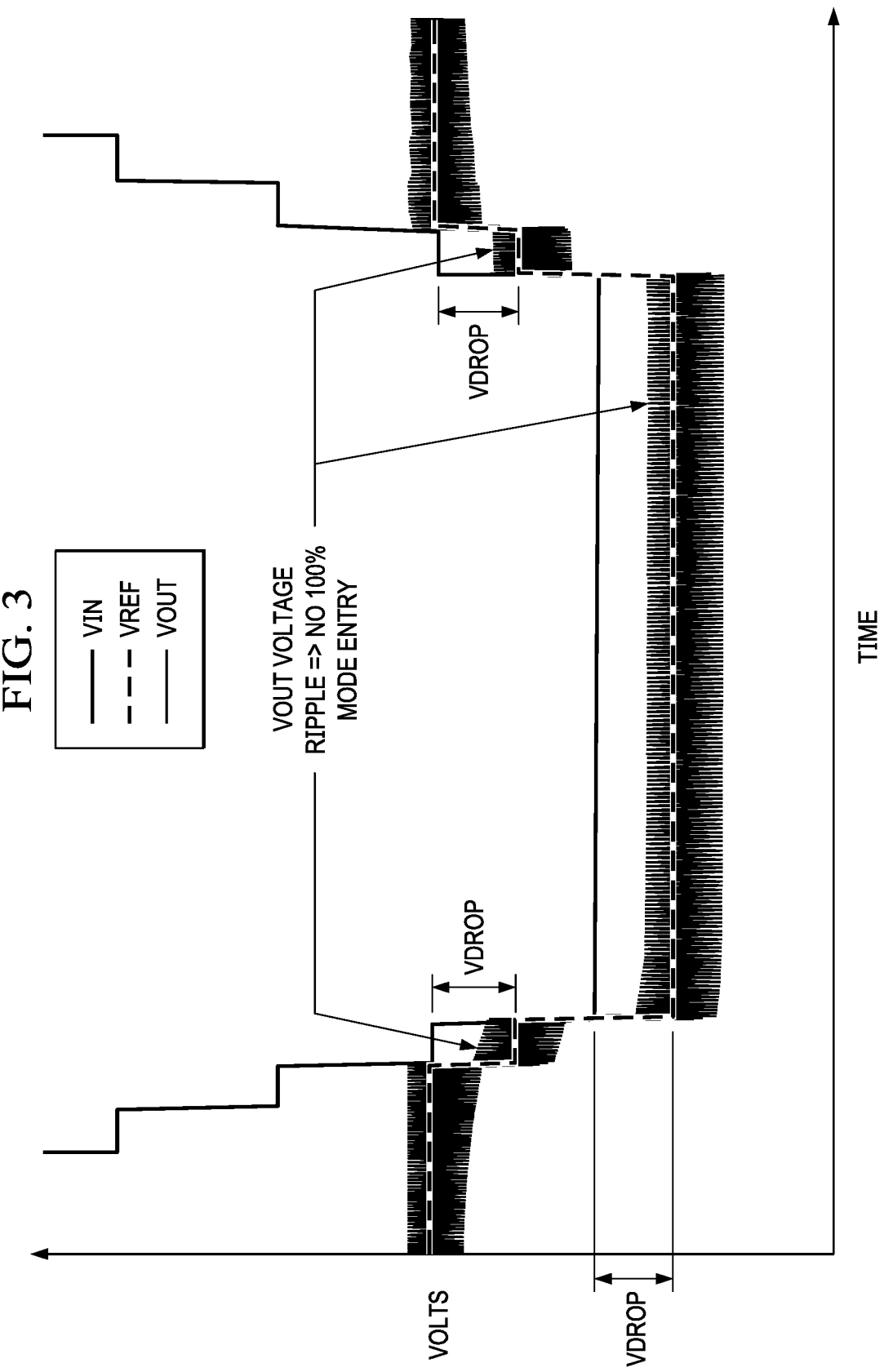
FIG. 3 is a timing diagram showing a 100% mode entry issue due to reference voltage amplifier dropout.

A straightforward step to reduce consumption in ultra-low current switching regulators is to remove the feedback divider (as in FIG. 1). But a challenge in system voltage headroom arises if direct feedback is used. With no feedback divider, the system reference (VREF) is equal to the targeted output voltage. In 100% mode, where VIN is equal or below the VOUT target, the amplifier in charge of generating VREF, supplied with VIN, enters in dropout. VREF falls several millivolts (VDROP) below VIN (VREF=VIN−VDROP). With VREF tracking VIN, the system keeps switching and regulating the VOUT towards the new reference VIN−VDROP and never enters 100% mode.

Thus, the new nano-Iq buck converter topology anticipates the 100% mode entry to slightly higher VIN input voltages. At higher input voltages the VREF amplifier dropout is avoided and thereby a stable constant reference VREF is guaranteed. With a constant reference VREF, the switching converter can enter smoothly into 100% mode.

Figure 4:
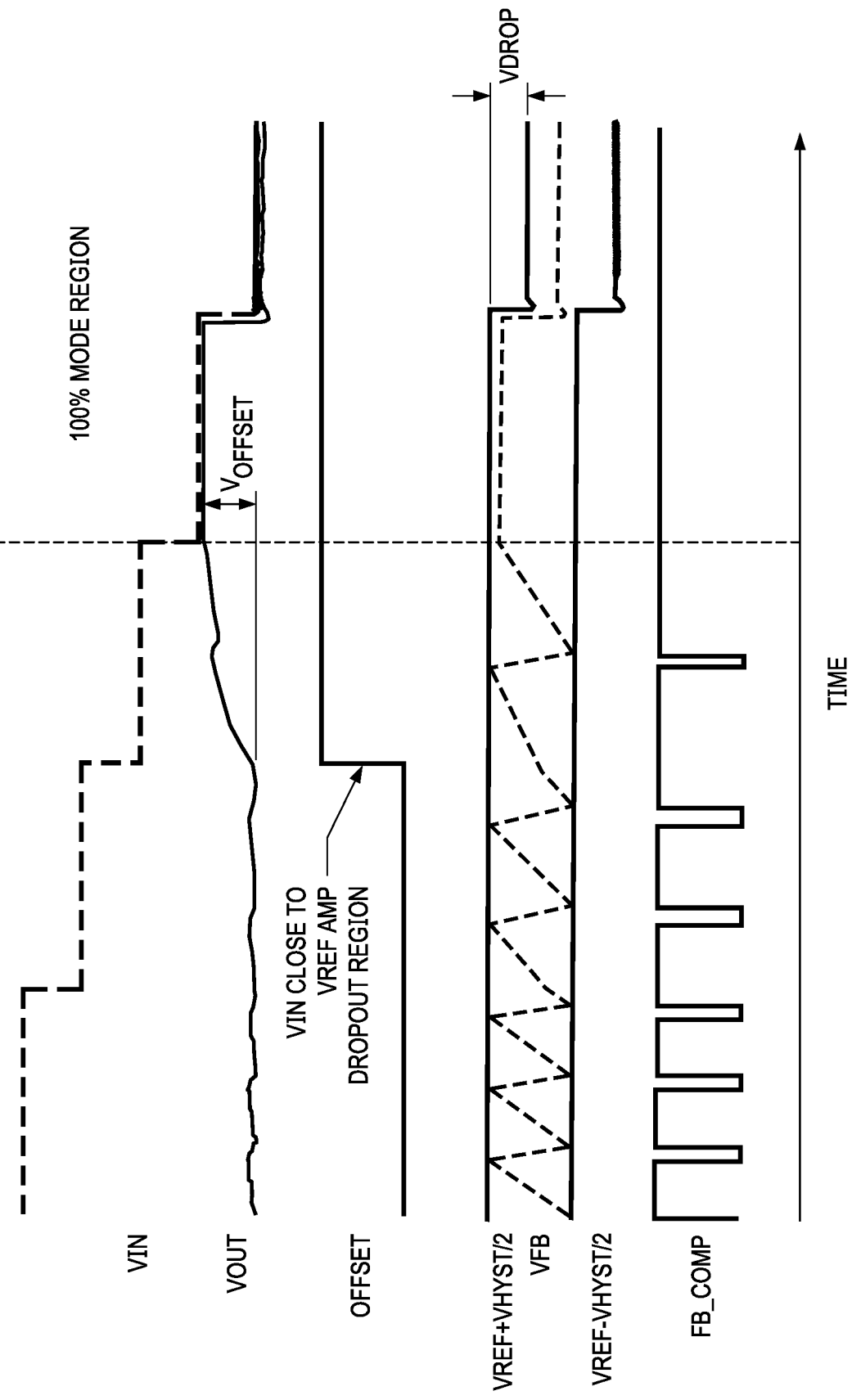
FIG. 4 is a timing diagram showing addition of an offset adjustment to an output voltage to anticipate 100% mode entry to higher input voltages away from an amplifier dropout region.

100% mode entry is set to higher VIN input voltages by adding a small positive voltage offset ($V_{OFFSET}$) to the output of the buck converter as represented in FIG. 4. $V_{OFFSET}$ cannot be injected at VREF because of the voltage headroom limitation. Instead, $V_{OFFSET}$ is inverted and injected in the feedback path. By pulling a current $I_{OFFSET}$ (~tens of nA) through a resistor (Rbias) the desired negative offset ($V_{OFFSET}=I_{OFFSET} \cdot Rbias$) is created at the feedback (FB) node of the hysteretic comparator (see FIG. 5). During 100% mode offset, the GM stage is disabled (M1 is turned off), otherwise the integrator function would cancel the desired $V_{OFFSET}$. Also, $I_{OFFSET}$ is enabled and M2 is turned on before the REFSYS drop-out region, i.e. at VIN>VOUT+VDROP.

With the new target voltage VOUT+$V_{OFFSET}$, the slopes $m_1$ and $m_{L1}$ are zero not at VIN=VOUT but at VIN=VOUT+$V_{OFFSET}$. With $m_1$ and $m_{L1}$ equal to zero at VIN=VOUT+$V_{OFFSET}$, VFB cannot reach the high-level threshold VREF+VHYST/2 and the system enters 100% mode. With VREF staying at its previous level (VOUT) but with 100% mode entry advanced to a higher VIN voltage VOUT+$V_{OFFSET}$, VIN−VREF at the 100% mode entry point is $V_{OFFSET}$. It is then sufficient to set $V_{OFFSET}$ higher than VDROP to avoid VREF amplifier dropout region at the new 100% mode entry point and thus ensure a stable system reference (VREF) that guarantees a smooth 100% mode transition. $V_{OFFSET}$ is activated (OFFSET=1) only at low VIN's (see FIG. 6), i.e. when approaching VREF amplifier dropout region.

Figure 5:
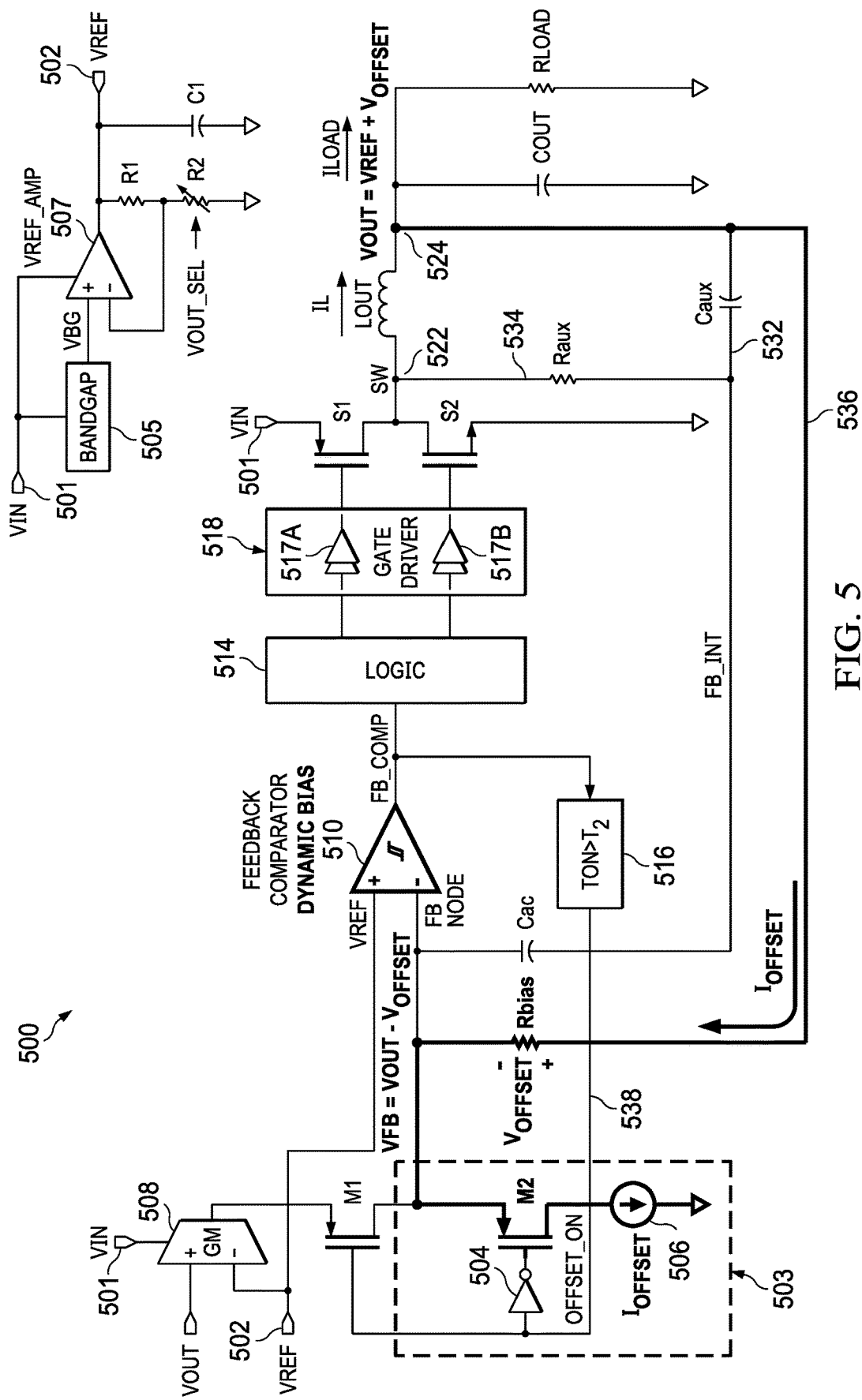
FIG. 5 is a block diagram of a nano-Iq buck converter topology with direct feedback and 100% mode circuitry in accordance with embodiments of the invention.

FIG. 5 shows an example of a nano-Iq buck converter circuit 500 with direct feedback and 100% mode circuitry. The feedback components that are active in 100% mode are bolded in FIG. 5. With the 100% mode circuitry, the nano-Iq buck converter circuit 500 is configured to detect when VIN approaches VOUT and to apply an offset to VOUT in response. More specifically, in the example of FIG. 5, the nano-Iq buck converter circuit 500 includes a 100% mode control circuit 516 configured to detect when TON is greater than a time threshold $T_2$ (i.e., TON>$T_2$). In response, the offset to VOUT is applied by adjusting the voltage at the feedback (FB) node of the hysteretic comparator 510. In the example of FIG. 5, the voltage at the FB node is adjusted using a 100% mode offset circuit 503 that includes an offset current ($I_{OFFSET}$) source 506 coupled to the FB node via a switch (M2). In operation, the application of $I_{OFFSET}$ to the FB node results in a voltage drop equal to $V_{OFFSET}$ at the FB node, where $V_{OFFSET}$ is a function of $I_{OFFSET}$ and Rbias in the feedback loop 536. In the example of FIG. 5, M2 is controlled by a control signal (OFFSET_ON) provided by the 100% mode control circuit 516. As shown, OFFSET_ON is provided to a control terminal of M2 via an inverter 504. OFFSET_ON also is used to disable the GM stage 508 (by turning M1 off) during the 100% mode so that the integrator function of the GM stage 508 does not cancel the desired $V_{OFFSET}$.

In the example of FIG. 5, the nano-Iq buck converter circuit 500 also includes various other nodes, components, or features that are noted hereafter for the sake of providing a fuller written description of the nano-Iq buck converter circuit 500. As shown, VREF is provided by a VREF amplifier 507 (VREF_AMP) supplied from the VIN node 501. The positive input to the VREF amplifier 507 is a bandgap voltage from a bandgap voltage source 505 supplied by the VIN node 501. The negative input to the VREF amplifier 507 is obtained from a voltage divider (R1 and R2) coupled to the output of the VREF amplifier 507. In the example of FIG. 5, R2 is adjustable based on a control signal (VOUT_SEL). The nano-Iq buck converter circuit 500 also includes a GM stage 508 coupled to the VIN node 501, a VOUT node (e.g., the output node 524), and the VREF node 502. In operation, the GM stage 508 operates as an error amplifier to provide converter output voltage accuracy based on VOUT and VREF. The output of the GM stage 508 is provided to a first current terminal of M1. The second current terminal of M1 is coupled to the FB node of the hysteretic comparator 510. Again, the control terminal of M1 is coupled to the 100% mode control circuit 516 to enable M1 to be turned off during 100% mode (disabling the error amplifier during the 100% mode).

In the example of FIG. 5, the hysteretic comparator 510 outputs a feedback comparison result (FB_COMP) based on the difference between VREF and the voltage at the FB node. FB_COMP is fed into the logic 514 and to the 100% mode control circuit 516. The 100% mode control circuit 516 uses FB_COMP to determine when TON is greater than a time threshold, $T_2$. Also, the logic 514 uses FB_COMP to control the state of the high-side and low-side switches (S1 and S2 respectively) through the gate driver 518. When FB_COMP is asserted or "high", S1 is on and S2 is off.

When FB_COMP is not asserted or "low", S1 is off and S2 is on. During operations of the nano-Iq buck converter circuit 500, a switch node (SW) 522 between S1 and S2 transitions between VIN (S1 on, S2 off) and ground (S1 off, S2 on) to regulate VOUT at the output node 524. When $V_{OFFSET}$ is applied, VOUT=VREF+$V_{OFFSET}$. Otherwise, VOUT=VREF.

In FIG. 5, the bolded components represent the components drawing current from VIN during 100% mode of the nano-Iq buck converter circuit 500. More specifically, the hysteretic comparator 510, M2, the offset current source 506, and the feedback loop 536 are active in the 100% mode of the nano-Iq buck converter circuit 500, where $V_{OFFSET}$ starts to be applied at the FB node of the hysteretic comparator 510 when TON>$T_2$.

Other features of the nano-Iq buck converter circuit 500 include a feedback loop 534 between the switch node 522 and the FB node of the hysteretic comparator 510. As shown, the feedback loop 534 includes a resistor (Raux) and a capacitor (Cac). Another feature of the nano-Iq buck converter circuit 500 is a feedback loop 532 between the output node 524 and the FB node of the hysteretic comparator 510. As shown, the feedback loop 532 includes a capacitor (Caux) and Cac. Also, the feedback loop 536 previously mentioned extends from the output node 524 to the FB node of the hysteretic comparator 510. The feedback loop 536 includes Rbias for DC regulation of VOUT. Rbias is leveraged to create $V_{OFFSET}$ at the FB node when approaching 100% mode region (using the voltage drop across Rbias when $I_{OFFSET}$ is present). When operating in 100% mode, the nano-Iq buck converter circuit 500 achieves an Iq of 150 nA or less at room temperature.

Figure 6:
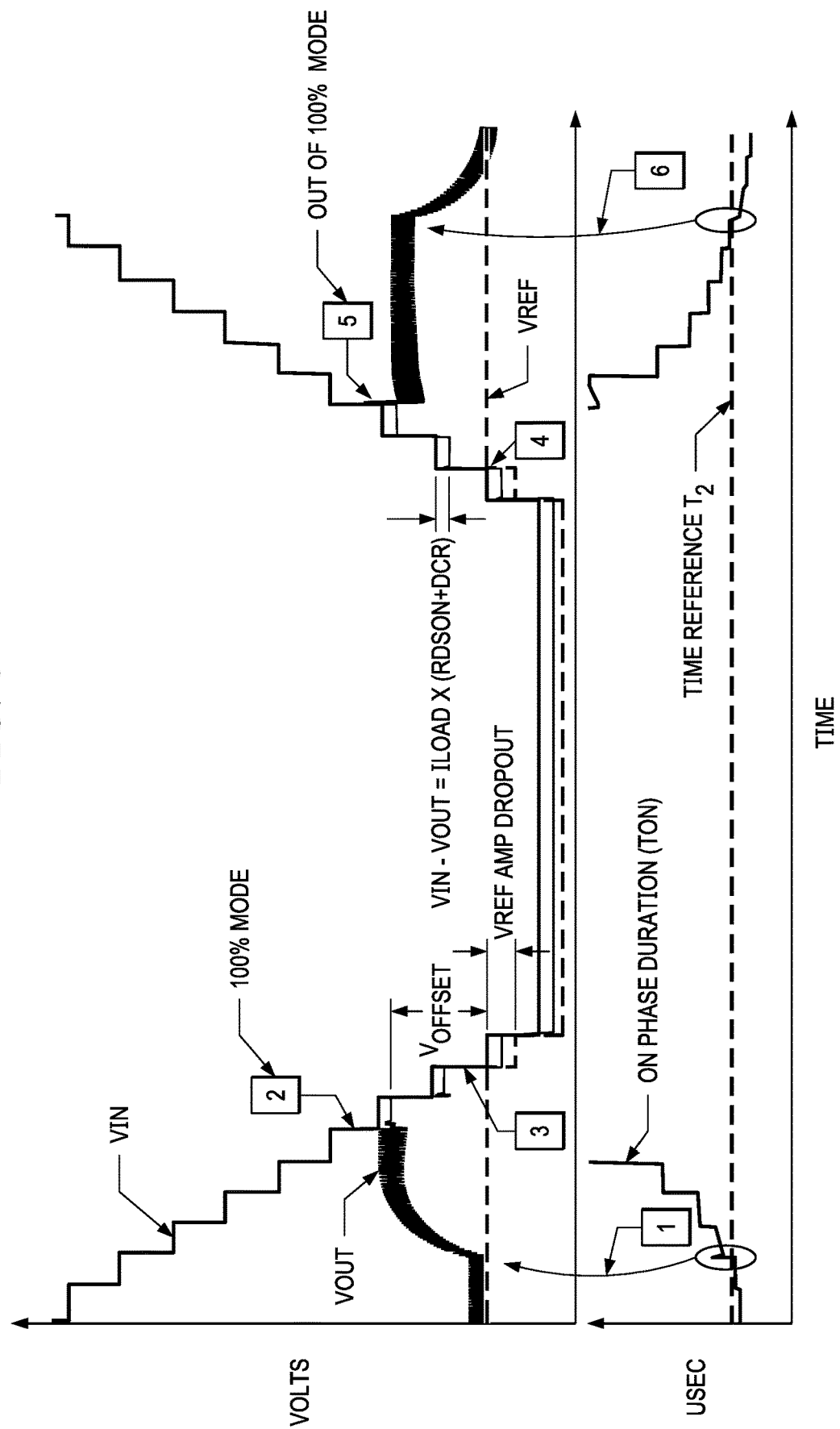
FIG. 6 is a timing diagram showing entering and exiting 100% mode in accordance with the nano-Iq buck converter topology of FIG. 5.

FIG. 6 shows 100% mode operation of the new nano-Iq buck converter topology (e.g., the nano-Iq buck converter 500 of FIG. 5). From time 0, VIN is stepped down and the converter increases duty cycle and on-time, $T_{ON}$, in order to maintain VOUT in regulation. Before time 1, VREF is maintained at VOUT level prior to the offset activation. At time 1, the TON duration exceeds the time threshold ($T_2$) and $V_{OFFSET}$ is activated, and the time constant Rbias·Caux determines $V_{OFFSET}$ settling time. At time 2, with output voltage already settled to VREF+$V_{OFFSET}$, VIN reaches the voltage level of the output node VOUT (minus the I·R drop in power FETs). Since VIN>>VREF+VDROP, system reference VREF stays stable and the converter can smoothly enter 100% mode: the high-side power FET is steady on. VIN continues being ramped down and, as expected in 100% mode, VOUT tracks VIN. From time 3, the VREF amplifier is in dropout. Some milliseconds later VIN is ramped up again. At time 4, the VREF amplifier is out of dropout and settles again to its target voltage. At time 5, VIN is above the voltage level of the output node VOUT (VIN>VREF+$V_{OFFSET}$). The system leaves 100% mode and starts switching again. VIN continues being ramped up and consequently TON time decreases. At time 6, TON time falls below the time threshold, $T_2$. $V_{OFFSET}$ offset is then removed and the regulator output voltage VOUT moves back to VREF voltage level. The observed difference between VIN and VOUT in 100% mode is due to voltage drop caused by ILOAD flowing through HS FET RDSON and inductor DCR.

A. Voltage Positioning for High Duty Cycle Operation $V_{OFFSET}$ not only solves the problem of 100% mode entry in nano-Iq buck converters but it supposes an additional advantage, which is voltage positioning for high duty cycle operation. At high duty cycles (e.g., in the range of 90%), buck converters can react very rapidly to high-to-low load steps limiting the voltage overshoot. On the other hand, buck converter response to low-to-high load steps is poor due to the long time that takes to build positive current in the inductor, LOUT, when VIN is close to VOUT. Typically, the way to limit output voltage deviation under this condition is by increasing the size of the output capacitor COUT. This asymmetric behavior of buck converters response at high duty cycles enables the possibility of a more efficient use of the total voltage tolerance window of the converter (DC and AC) by offsetting VOUT to slighter higher voltages: VOUT+$V_{OFFSET}$. With this voltage offset, the converter gets extra voltage room in the lo-to-hi transient while the lost margin in the hi-to-lo transient can be handled by the faster response of the converter.

Figure 7:
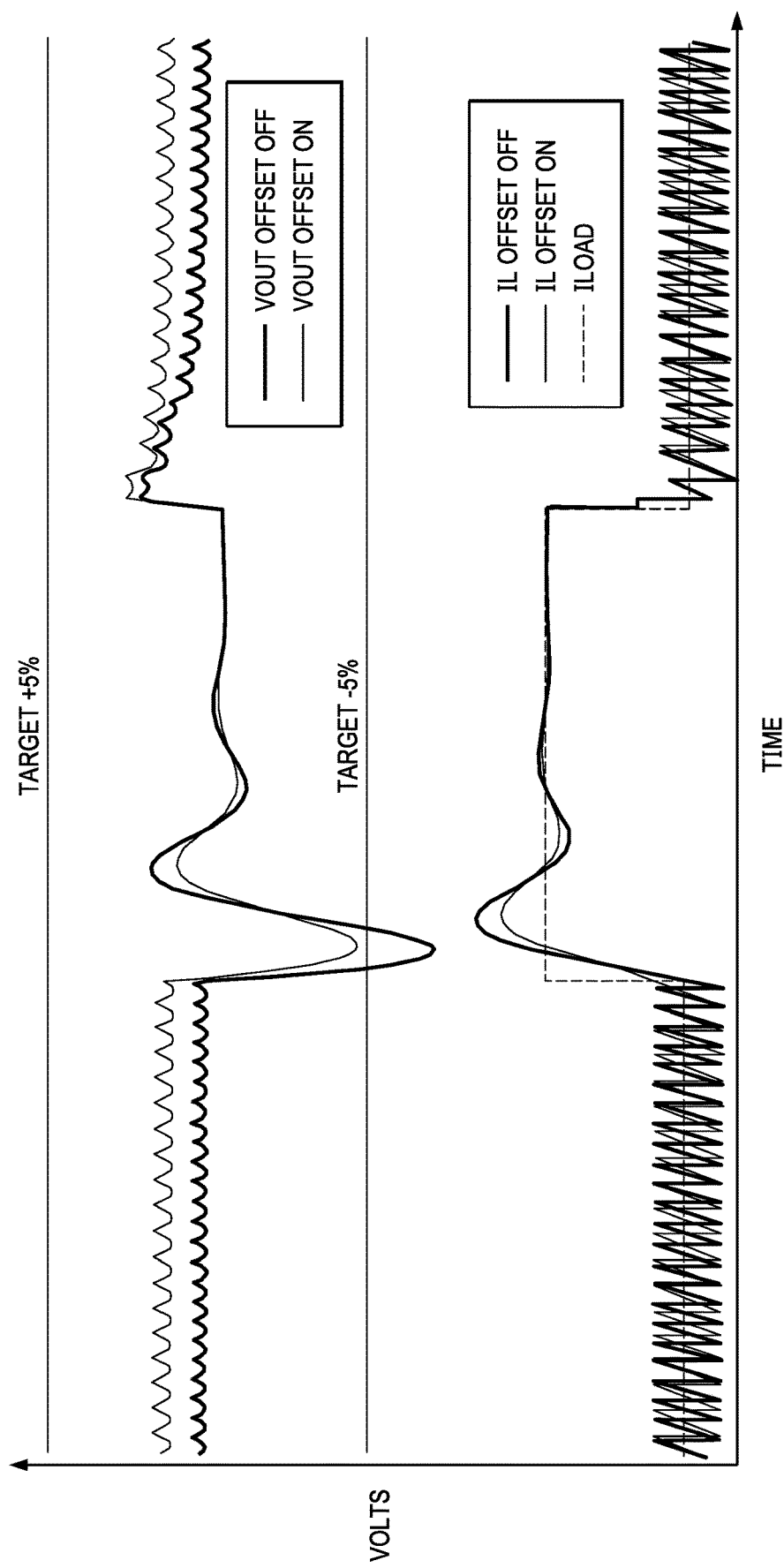
FIG. 7 is a timing diagram showing load comparison of a buck converter with voltage positioning (with VOUT offset active and represented using thinner lines) and without voltage positioning (with VOUT offset disabled and represented with bolded lines)
Figure 8:
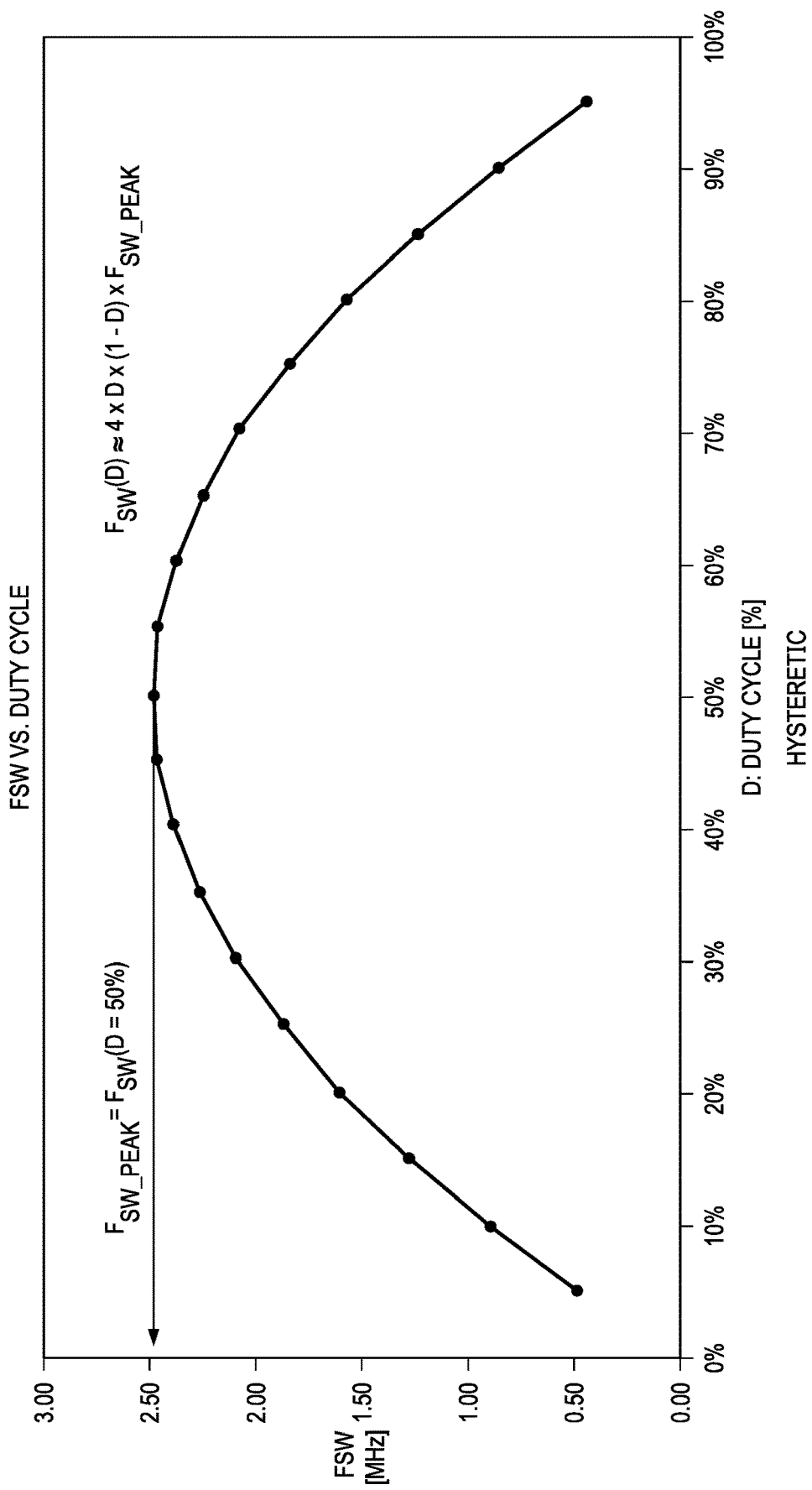
FIG. 8 is a graph showing a switching frequency characteristic of a hysteretic buck converter.

As a result of the voltage positioning at high duty cycles, the converter can operate with smaller output capacitors in this high duty cycle operating area. FIG. 7 shows a load step comparison of a buck converter w/voltage positioning (with VOUT offset active and represented using thinner lines in FIG. 7) and without voltage positioning (with VOUT offset disabled and represented using bolded lines in FIG. 7). If a tolerance window of +/−5% is specified, the converter with voltage positioning would fall within the tolerance window while the converter with no voltage positioning would need a larger output capacitor Cout to be in spec. In both cases peak voltage at overshoot is similar.

For voltage positioning IOFFSET is preferably VOUT dependent in order to get a fixed relative offset on VOUT (e.g., $V_{OFFSET}$(VOUT)/VOUT=0.01 for 1% voltage positioning). $V_{OFFSET}$ for the minimum VOUT is preferably higher than VDROP to ensure 100% mode entry. If voltage positioning is not desired and it is preferable to minimize VOUT offset, a constant current is used for $I_{OFFSET}$ such that $I_{OFFSET} \times$Rbias=$V_{OFFSET}$>VDROP_MAX. VDROP_MAX is typically independent of VOUT.

As desired, $V_{OFFSET}$ may be used only at high duty cycles to ensure 100% mode transition and to benefit from voltage positioning feature. Having this in mind, at least 2 criteria can be considered to decide when to activate the $V_{OFFSET}$: 1) $V_{OFFSET}$ active at a fixed VIN−VOUT difference; and 2) $V_{OFFSET}$ active at a fixed duty cycle. To support the concepts, it is assumed that, for any input voltages VIN, the converter has the switching frequency characteristic shown in FIG. 8. Such a frequency characteristic is very common in different types of converters, especially at extreme duty cycles (very high and very low duty cycles). High duty cycle is the operating area where this invention applies. The disclosed invention is not limited to switching converter with this frequency behavior and can be adapted to any other frequency characteristic curve.

(a) $V_{OFFSET}$ Active at a Fixed VIN−VOUT Difference

When VIN is falling down, the voltage offset ($V_{OFFSET}$) is activated just before VREF amplifier enters dropout, i.e. at $VIN_{TH}$=VOUT+VDROP, where VDROP can be considered a constant independent of VOUT. The offset is then activated at a fixed or target VIN−VOUT difference which in this case is defined to be VDROP. This dropout can be detected by measuring the on-time $T_{ON}$ duration: As VIN moves down and approaches the dropout condition, $T_{ON}$ rises because of a higher duty cycle used for VOUT regulation and, in this example, because of frequency drop (FIG.

8). The decision point $VIN_{TH}$=VOUT+VDROP corresponds to a duty cycle $D_{OFFSET}$(VOUT)=VOUT/$VIN_{TH}$=VOUT/(VOUT+VDROP). Knowing the switching frequency characteristic of the converter $F_{SW}$(D) (FIG. 8), the time threshold $T_2$(VOUT) equivalent to the dropout condition ($VIN_{TH}$) can be determined:

$$T_2(VOUT) = \frac{D_{OFFSET}(VOUT)}{F_{SW}(D = D_{OFFSET}(VOUT))} \approx \qquad \text{Eq. (5)}$$
$$\frac{1}{4} \times \frac{1}{1 - D_{OFFSET}(VOUT)} \times \frac{1}{F_{SW\_PEAK}}.$$

Since VDROP<<VOUT, the previous equation can be simplified:

$$T_2(VOUT) \approx \frac{1}{4} \times \frac{VOUT}{VDROP} \times \frac{1}{F_{SW\_PEAK}}, \qquad \text{Eq. (6)}$$

where $F_{SW\_PEAK}$ is determined by a hysteresis window (VHYST) and by a time constant (Raux*Caux).

Eq. 6 indicates that in order to achieve $V_{OFFSET}$ activation at a fixed voltage difference VIN−VOUT (being VIN−VOUT equal to VDROP in this example), a time threshold ($T_2$) that is proportional to VOUT is a valid option. This criterion minimizes the duty cycle range where $V_{OFFSET}$ is active. Another option to activate $V_{OFFSET}$ at a fixed or target VIN−VOUT difference is to use a VIN−VOUT comparator, where a voltage threshold is used to define the fixed or target VIN−VOUT difference at which $V_{OFFSET}$ is activated.

b) $V_{OFFSET}$ Active at a Fixed Duty Cycle

Following the same reasoning as above, the time threshold, $T_2$, to activate $V_{OFFSET}$ at a fixed duty cycle ($D_{OFFSET}$) is:

$$T_2 \approx \frac{1}{4} \times \frac{1}{1 - D_{OFFSET}} \times \frac{1}{F_{SW\_PEAK}}. \qquad \text{Eq. (7)}$$

Eq. 7 indicates that in order to achieve $V_{OFFSET}$ activation at a fixed duty cycle ($D_{OFFSET}$), a constant time threshold ($T_2$) is a valid option. In both cases ($V_{OFFSET}$ active at a fixed VIN−VOUT difference and $V_{OFFSET}$ active at a fixed duty cycle), the timer used to generate the time threshold, $T_2$, may be disabled once the decision to go in 100% mode has been taken to achieve low Iq in 100% mode. The hysteretic comparator, the only circuit hold on together with REFSYS, terminates 100% mode (FB_COMP=0) when VIN>VOUT+$V_{OFFSET}$ and VOUT+$V_{OFFSET}$>VREF.

Figure 9:
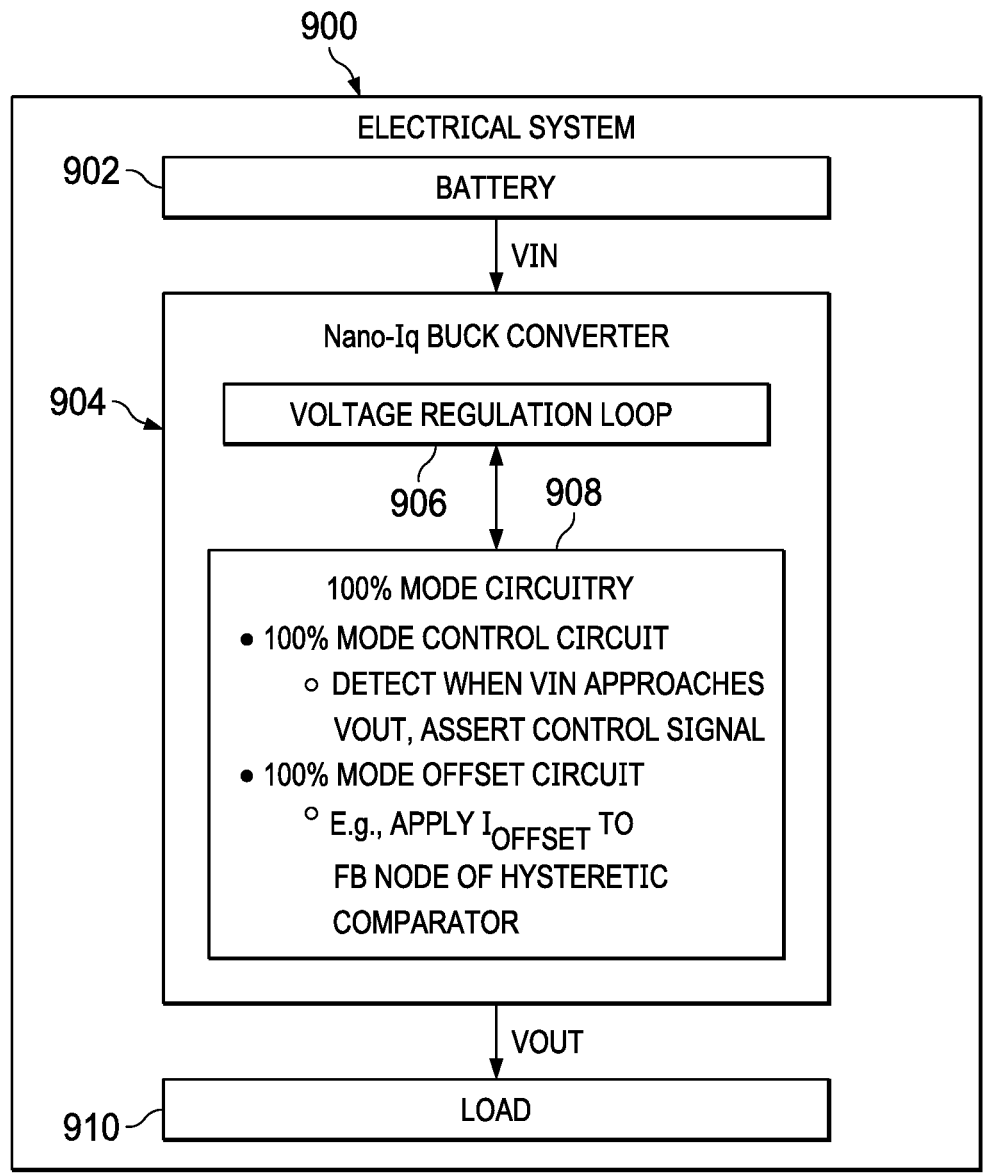
FIG. 9 is a block diagram of an example electrical system.

FIG. 9 is a block diagram of an example electrical system 900 in accordance with various examples. The electrical system 900 in an example of a battery-powered electronic device, such as a smart phone, a wearable, a tablet computer, or other battery-powered electronic device. As shown, the electrical system 900 includes a battery 902 (e.g., different batteries may provide voltages in the range of 1.8-6.5 Volts) coupled to a nano-Iq buck converter 904, where the nano-Iq buck converter 904 provides VOUT to a load 910 based on VIN from the battery 902 (or a regulation circuit between the battery 902 and the nano-Iq buck converter 904). The nano-Iq buck converter 904 (an example of the nano-Iq buck converter 500 of FIG. 5) includes a voltage regulation loop 906 and 100% mode circuitry 908. For example, relating the nano-Iq buck converter 904 of FIG. 9 to the nano-Iq buck converter 500 of FIG. 5, the voltage regulation loop 906 corresponds to the hysteretic comparator 510, the logic 514, the gate driver 518, S1, S2, and feedback loops 532, 534, and 536. The voltage regulation loop 906 may also correspond to the GM stage 508 and M1 in FIG. 5. Meanwhile, the 100% mode circuitry 908 corresponds to the 100% mode control circuit 516 of FIG. 5 to determine when to apply the offset. The 100% mode circuitry 908 also corresponds to the 100% mode offset circuit 503 and the feedback loop 536 (with Rbias) of FIG. 5, where the 100% mode offset circuit 503 and Rbias are used to generate the offset in response to a control signal (OFFSET_ON in FIG. 5) from the 100% mode control circuit 516. In operation, the 100% mode circuitry 908 is configured to apply an offset to VOUT in response to detecting that VIN is approaching VOUT. The applied offset should be greater than a predetermined VREF amplifier dropout. In some examples, the load 910 varies over time, and the nano-Iq buck converter 904 has a quiescent current below 60 nA when the load 910 is off and 100% mode offset is not activated.

In some examples, the applied offset is achieved using an offset current circuit (e.g., the 100% mode offset circuit 503 in FIG. 5 is an example of an offset current circuit) of the 100% mode circuitry 908, where the offset current circuit is configured to apply an offset current to a FB node of a hysteretic comparator (e.g., the hysteretic comparator 510) of the voltage regulation loop 906. In some examples, an offset current circuit (see e.g., the 100% mode offset circuit 503 in FIG. 5) includes a transistor (e.g., M2 in FIG. 5) having a first current terminal coupled to the FB node (e.g., FB in FIG. 5) of the hysteretic comparator (e.g., the hysteretic comparator 510 in FIG. 5), a second current terminal coupled to an offset current source (e.g., the offset current source 506 in FIG. 5), and a control terminal coupled to a detection circuit (e.g., the 100% mode control circuit 516 in FIG. 5) configured to detect when VIN approaches VOUT. In some examples, the detection circuit is a time-based detection circuit, where the time-based detection circuit is configured to assert an offset on signal (e.g., OFFSET_ON in FIG. 5) in response to a switch on-time being greater than a time threshold (e.g., TON>$T_2$). In some examples, the time-based detection circuit is configured to assert an offset on signal based on a target difference between VIN and VOUT. Also, in some examples, the 100% mode circuitry 908 comprises a feedback loop (e.g., the feedback loop 536 in FIG. 5) between the output node (e.g., output node 524 in FIG. 5) of the nano-Iq buck converter and a FB node of a hysteretic comparator (e.g., FB for the hysteretic comparator 510 in FIG. 5) of the voltage regulation loop 906. In this example, the 100% mode circuitry 908 may be configured to assert an offset on signal based on a target difference between VIN and VOUT. In one example, the target difference between VIN and VOUT is identified using a time-based detection circuit to determine when the on-time phase duration (TON) crosses a time threshold (e.g., $T_2$). In another example, the target different between VIN and VOUT is identified using a voltage comparison circuit (e.g., a VIN−VOUT comparator) to identifying when crossing of a voltage threshold occurs.

In some examples, the nano-Iq buck converter 904 also includes an error amplifier circuit (e.g., M1 and GM stage 508 in FIG. 5), where the error amplifier circuit is disabled based on the offset on signal provided by the detection circuit of the 100% mode circuitry 908.

In some examples, a switching converter device (e.g., an integrated circuit (IC), a packaged die, a multi-die module (MDM), a printed circuit board (PCB) with one or more ICs) includes a voltage regulation loop (e.g., the voltage regulation loop 906). The voltage regulation loop includes a VIN node (e.g., VIN node 501 in FIG. 5), a VOUT node (e.g., VOUT node 524 in FIG. 5), and a VREF node (e.g., the VREF node 502 in FIG. 5). The voltage regulation loop also includes a hysteretic comparator (e.g., the hysteretic comparator 510 in FIG. 5) coupled to the VREF node; control logic (e.g., logic 514 in FIG. 5) coupled to an output of the hysteretic comparator; a driver circuit (e.g., the gate driver 518 in FIG. 5) coupled to at least one output of the control logic; a high-side switch (e.g., S1) coupled the VIN node (e.g., the VIN node 501) and to an output of the driver circuit; and a low-side switch (e.g., S2) coupled to a ground node and to the output of the driver circuit. Note: both S1 and S2 are controlled by the hysteretic comparator 510 through control logic 514.

The switching converter device also comprises a 100% mode circuitry (e.g., the 100% mode circuitry 908), where the 100% mode circuitry includes a detection circuit (e.g., the 100% mode control circuit 516 in FIG. 5). In some examples, the detection circuit is configured to determine when VIN approaches VOUT to within a threshold amount. The 100% mode offset control circuit also includes an offset application circuit (e.g., the 100% mode offset circuit 503 and feedback loop 536 in FIG. 5). In some examples, the time-based detection circuit is configured to compare an on-time (e.g., TON in FIG. 5) for the high-side switch with a time threshold (e.g., $T_2$ in FIG. 5), and to output an offset on signal to the offset application circuit in response to the on-time being greater than the time threshold. The switch converter device also includes an error amplifier circuit (e.g., the GM stage 508 and M1 in FIG. 5) coupled to a FB node of the hysteretic comparator, where the error amplifier circuit is disabled based on the offset on signal. In some examples, the offset application circuit is configured to apply an offset to VOUT, wherein the offset is greater than a predetermined reference voltage amplifier dropout.

In some examples, the offset application circuit comprises an offset current circuit (e.g., the 100% mode offset circuit 503 in FIG. 5) configured to apply an offset current to the FB node of the hysteretic comparator. In some examples, the offset application circuit comprises an offset current circuit with a transistor (e.g., M2 in FIG. 5) having a first current terminal coupled to the FB node of the hysteretic comparator, a second current terminal coupled to an offset current source (e.g., the offset current source 506 in FIG. 5), and a control terminal coupled to the detection circuit (e.g., the 100% mode control circuit 516 in FIG. 5).

In some examples, a switching converter device (e.g., an IC or chip with components of a nano-Iq buck converter circuit such as the nano-Iq buck converter circuit 500 in FIG. 5) includes a comparator (e.g., comparator 510 in FIG. 5) configured to compare a reference voltage (e.g., VREF in FIG. 5) and a feedback voltage (e.g., VFB in FIG. 5). The switching converter device includes first means for adjusting the feedback voltage with an error amplifier turned on. The switching converter device also includes a second means for adjusting the feedback voltage with the error amplifier turned off. In one example, the first means for adjusting the feedback voltage includes the GM 508 in FIG. 5, and the second means for adjusting the feedback voltage includes the 100% mode offset circuit 503 in FIG. 5. The switching converter device also includes: 1) means for detecting that an input voltage of the switching converter device is approaching the output voltage of the switching converter device; and 2) means for switching from the first means for adjusting the feedback voltage to the second means for adjusting the feedback voltage in response to detecting that the input voltage has approached the output voltage. In one example, the means for detecting that an input voltage of the switching converter device is approaching the output voltage of the switching converter device comprises the 100% mode control circuit 516 in FIG. 5. Also, in one example, the means for switching from the first means for adjusting the feedback voltage to the second means for adjusting the feedback voltage comprises the switches M1 and M2 in FIG. 5 (e.g., M1 is opened and M2 is closed when the switching converter device is in 100% mode). In some examples, the switching converter device also includes means for detecting that the input voltage no longer approaches the output voltage. In one example, the means for detecting that an input voltage of the switching converter device no longer approaches the output voltage comprises the 100% mode control circuit 516 in FIG. 5. In some examples, the switching converter device also includes means for switching from the second means for adjusting the feedback voltage to the first means for adjusting the feedback voltage in response to detecting that the input voltage no longer approaches the output voltage. In one example, the means for switching from the second means for adjusting the feedback voltage to the first means for adjusting the feedback voltage comprises the switches M1 and M2 in FIG. 5 (e.g., M1 is closed and M2 is open when the switching converter device is not in 100% mode).

The term "couple" is used throughout the specification. The term may cover connections, communications, or signal paths that enable a functional relationship consistent with the description of the present disclosure. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

Modifications are possible in the described embodiments, and other embodiments are possible, within the scope of the claims. For example, the disclosed 100% features can be applied to buck converters that use TON-based control of S1 and S2, as well as other types of buck converter that do not use TON to control S1 and S2.

What is claimed is:
1. A system, comprising:
a buck converter configured to provide an output voltage at an output terminal, wherein the output voltage is responsive to an input voltage at an input terminal;
a battery coupled to the input terminal;
a load coupled to the output terminal, wherein the buck converter includes:
a voltage regulation loop that includes a hysteretic comparator; and
100% mode circuitry coupled to the voltage regulation loop, wherein the 100% mode circuitry is configured to add an offset voltage to the output voltage in response to detecting that the input voltage is approaching the output voltage, and the 100% mode circuitry includes:
a first transistor having first and second current terminals and a first control terminal, wherein the first current terminal is coupled to an input terminal of the hysteretic comparator;
a current source coupled between the second current terminal and a ground terminal;
a 100% mode offset circuit configured to apply an offset current to the input terminal of the hysteretic comparator, wherein the 100% mode offset circuit includes a second transistor having a second control terminal and third and fourth current terminals, in which the third current terminal is coupled to the input terminal of the hysteretic comparator, the fourth current terminal is coupled to an output of an error amplifier, and the second control terminal is coupled to a 100% mode control circuit that is configured to detect if the input voltage approaches the output voltage; and
a feedback loop resistor coupled between the output terminal and the input terminal of the hysteretic comparator.

2. The system of claim 1, wherein the offset voltage is greater than a reference voltage amplifier dropout voltage.

3. The system of claim 1, wherein the offset voltage is used as voltage positioning at duty cycles higher than a threshold.

4. The system of claim 1, wherein the 100% mode control circuit includes a time-based detection circuit, and wherein the time-based detection circuit is configured to provide an offset signal responsive to detecting that a switch on-time is greater than a time threshold.

5. The system of claim 4, wherein the buck converter further comprises an error amplifier circuit, and wherein the error amplifier circuit is disabled responsive to the offset signal.

6. The system of claim 1, wherein the 100% mode circuitry is configured to assert the offset voltage in response to detecting that a difference between the input voltage and the output voltage is less than a voltage threshold.

7. The system of claim 1, wherein the 100% mode circuitry is configured to assert the offset voltage based on a fixed duty cycle.

8. A switching converter device having an input voltage terminal and an output voltage terminal, the switching converter device comprising:
a hysteretic comparator having a comparator output and first and second comparator inputs, wherein the first comparator input is coupled to a reference voltage terminal;
an on-time control logic circuit having a logic input and a logic output, wherein the logic input is coupled to the comparator output;
a driver circuit having a driver input and first and second driver outputs, wherein the driver input is coupled to the logic output;
a high-side switch coupled to the input voltage terminal and having a high-side control terminal coupled to the first driver output;
a low-side switch coupled between ground and the second driver output, and having a low-side control terminal coupled to the second driver output;
a 100% mode offset circuit having an offset output coupled to the comparator output, the offset output providing an offset signal responsive to detecting that a voltage at the input voltage terminal is approaching a voltage at the output voltage terminal, wherein the 100% mode offset circuit is configured to compare an on-time for the high-side switch with a time threshold, and to provide the offset signal responsive to the on-time being greater than the time threshold, and the 100% mode offset circuit includes:
a transistor having first and second current terminals and a control terminal, wherein the first current terminal is coupled to the second comparator input; and
a current source coupled between the second current terminal and ground;
and
an error amplifier circuit coupled to a feedback terminal of the hysteretic comparator, wherein the error amplifier circuit is disabled responsive to the offset signal.

9. The switching converter device of claim 8, wherein the 100% mode offset circuit is a time-based detection circuit.

10. The switching converter device of claim 8, wherein the offset output provides the offset signal responsive to detecting that a difference between the voltage at the input voltage terminal and the voltage at the output voltage terminal is less than a voltage threshold.

11. The switching converter device of claim 8, wherein the offset signal is based on a fixed duty cycle.

12. The switching converter device of claim 8, wherein the offset signal is greater than a reference voltage amplifier dropout voltage.

13. The switching converter device of claim 8, wherein the offset signal is used as voltage positioning at duty cycles higher than a threshold.

14. The switching converter device of claim 8, wherein the 100% mode offset circuit includes an offset current circuit having the transistor with the first current terminal coupled to the feedback terminal of the hysteretic comparator, the second current terminal coupled to an offset current source, and the control terminal coupled to the 100% mode offset circuit.

15. A switching converter circuit, comprising:
a voltage regulation loop configured to provide an output voltage based on an input voltage;
100% mode circuitry coupled to the voltage regulation loop, wherein the 100% mode circuitry is configured to add an offset voltage to the output voltage in response to detecting that the input voltage is approaching the output voltage, wherein the 100% mode circuitry includes:
a transistor having first and second current terminals, wherein the first current terminal is coupled to an input terminal of a hysteretic comparator; and
a current source coupled between the second current terminal and ground;
and
an error amplifier circuit coupled to the input terminal of the hysteretic comparator, wherein the error amplifier circuit is disabled responsive to an offset on a signal provided by the 100% mode circuitry responsive to the input voltage approaching to within a threshold amount of the output voltage.

16. The switching converter circuit of claim 15, wherein the 100% mode circuitry includes:
a 100% mode control circuit configured to provide an offset signal in response to detecting that a switch on-time is greater than a time threshold; and
a 100% mode offset circuit coupled to the 100% mode control circuit, wherein the 100% mode offset circuit is configured to apply an offset current to the input terminal of the hysteretic comparator.

* * * * *